US010489308B2

United States Patent
Bear et al.

(10) Patent No.: US 10,489,308 B2
(45) Date of Patent: Nov. 26, 2019

(54) MITIGATING ATTACKS ON KERNEL ADDRESS SPACE LAYOUT RANDOMIZATION

(71) Applicant: Intel Corporation, Santa Clara, CA (US)

(72) Inventors: Uri Bear, Pardes-Hana (IL); Gyora Benedek, Kiriat Bialik (IL); Baruch Chaikin, Misgav (IL); Jacob Jack Doweck, Haifa (IL); Reuven Elbaum, Haifa (IL); Dimitry Kloper, Haifa (IL); Elad Peer, Yokneam Ilit (IL); Chaim Shen-orr, Haifa (IL); Yonatan Shlomovich, Givat-Ada (IL)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 15/637,524

(22) Filed: Jun. 29, 2017

(65) Prior Publication Data
US 2019/0004972 A1 Jan. 3, 2019

(51) Int. Cl.
*G06F 12/14* (2006.01)
*G06F 12/1009* (2016.01)
*G06F 12/1045* (2016.01)

(52) U.S. Cl.
CPC ........ *G06F 12/145* (2013.01); *G06F 12/1009* (2013.01); *G06F 12/1063* (2013.01);
(Continued)

(58) Field of Classification Search
CPC ............... G06F 12/145; G06F 12/1009; G06F 12/1483; G06F 12/1491; G06F 12/1063;
(Continued)

(56) References Cited

U.S. PATENT DOCUMENTS

| 8,694,738 B2 * | 4/2014 | Bhattacharjee ..... G06F 12/1475 711/151 |
| 2012/0255010 A1 * | 10/2012 | Sallam .................. G06F 21/572 726/24 |

(Continued)

OTHER PUBLICATIONS

Evtyushkin, Dmitry, et al., "Jump Over ASLR: Attacking Branch Predictors to Bypass ASLR", IEEE, (2016), 13 pgs.

(Continued)

*Primary Examiner* — Ryan Bertram
(74) *Attorney, Agent, or Firm* — Schwegman Lundberg & Woessner, P.A.

(57) ABSTRACT

Various systems and methods for detecting and preventing side-channel attacks, including attacks aimed at discovering the location of KASLR-randomized privileged code sections in virtual memory address space, are described. In an example, a computing system includes electronic operations for detecting unauthorized attempts to access kernel virtual memory pages via trap entry detection, with operations including: generating a trap page with a physical memory address; assigning a phantom page at an open location in the privileged portion of the virtual memory address space; generating a plurality of phantom page table entries corresponding to an otherwise-unmapped privileged virtual memory region; placing the trap page in physical memory and placing the phantom page table entry in a page table map; and detecting an access to the trap page via the phantom page table entry, to trigger a response to a potential attack.

25 Claims, 11 Drawing Sheets

(52) U.S. Cl.
CPC ...... *G06F 12/1483* (2013.01); *G06F 12/1491* (2013.01); *G06F 2212/1052* (2013.01); *G06F 2212/283* (2013.01); *G06F 2212/651* (2013.01); *G06F 2212/68* (2013.01); *G06F 2212/684* (2013.01)

(58) Field of Classification Search
CPC ....... G06F 2212/1052; G06F 2212/283; G06F 2212/651; G06F 2212/68; G06F 2212/684
See application file for complete search history.

(56) References Cited

U.S. PATENT DOCUMENTS

| | | | |
|---|---|---|---|
| 2014/0173600 A1* | 6/2014 | Ramakrishnan Nair | G06F 9/461 718/1 |
| 2014/0181976 A1* | 6/2014 | Snow | G06F 21/53 726/23 |
| 2015/0089146 A1* | 3/2015 | Gotwalt | G06F 12/1009 711/133 |

OTHER PUBLICATIONS

Fogh, Anders, et al., "Using Undocumented CPU Behavior to See into Kernel Mode and Break KASLR in the Process", (Aug. 4, 2016), 110 pgs.

Gruss, Daniel, et al., "Prefetch Side-Channel Attacks: Bypassing SMAP and Kernel ASLR", CCS'16, (2016), 368-379.

Hund, Ralf, et al., "Practical Timing Side Channel Attacks Against Kernel Space ASLR", IEEE Symposium on Security and Privacy, (2013), 191-205.

Jang, Yeongjin, et al., "DrK: Breaking Kernel Address Space Layout Randomization with Intel TSX", blackhat USA, (2016), 69 pgs.

Jang, Yeongjing, et al., "Breaking Kernel Address Space Layout Randomization with Intel TSX", ACM SIGSAC Conference, (2016), 16 pgs.

Lu, Kangjie, et al., "UniSan: Proactive Kernel Memory Initialization to Eliminate Data Leakages", ACM, (2016), 13 pgs.

\* cited by examiner

MITIGATING ATTACKS ON KERNEL ADDRESS SPACE LAYOUT RANDOMIZATION

TECHNICAL FIELD

Embodiments described herein generally relate to security techniques applied in computing systems, and in particular, to security enhancement techniques applied in connection with address space layout randomization methods.

BACKGROUND

After the introduction of Data Execution Prevention (DEP) into various operating systems, attackers have resorted to various techniques for executing existing code to perform malicious or unauthorized actions. A common target for attackers is the execution of privileged (e.g., "Ring 0") code, such as operating system (OS) kernel code, which may be executed in a computing system at the highest levels of privilege, For instance, one attack technique involves the use of existing sections of privileged code and exploiting ROP (Return Oriented Programming) to chain "gadgets"—pieces of privileged code already loaded into memory—to form an attack that needs privileged permissions.

In modern computers, software is written in terms of a virtual space, with use of virtual addresses. An attacker therefore has to know the address of the "gadgets" that they intend to use, in their own virtual space. Computing systems have attempted to protect against ROP and similar attacks through techniques such as Kernel Address Space Randomization (KASLR). KASLR is a feature of modern OSs, designed to deny knowledge of where potential "gadgets" are located within the processes' virtual address space, thus preventing ROP and similar attacks. However, attacks have been developed to defeat address randomization techniques and locate the addresses of privileged (e.g., "Ring 0") code in virtual memory, and code and data from other application (e.g., "Ring 3") processes. These attacks make use of the fact that, for performance reasons, the kernel maps itself into the process' virtual address space.

BRIEF DESCRIPTION OF THE DRAWINGS

In the drawings, which are not necessarily drawn to scale, like numerals may describe similar components in different views, Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for the detection and mitigation of side-channel analysis (SCA) attacks that attempt to locate privileged pages in system memory. In particular, the techniques discussed herein are applicable to detect kernel region probing activities launched from SCA attacks, including SCA attacks on Kernel Space Address Layout Randomization (KASLR) that are designed to defeat current attack detection and mitigation methods.

Modern computer systems employ large amounts of Random Access Memory (RAM), which—for cost and other reasons—are located outside the CPU itself. Accessing such RAM is relatively slow compared to other CPU operations. In order to improve performance, modern CPUs incorporate hierarchical memory systems, where faster (but smaller) memory elements, including caches and Translation Lookaside Buffers (TLBs), are located logically and/or physically closer to the CPU.

Figure 1:
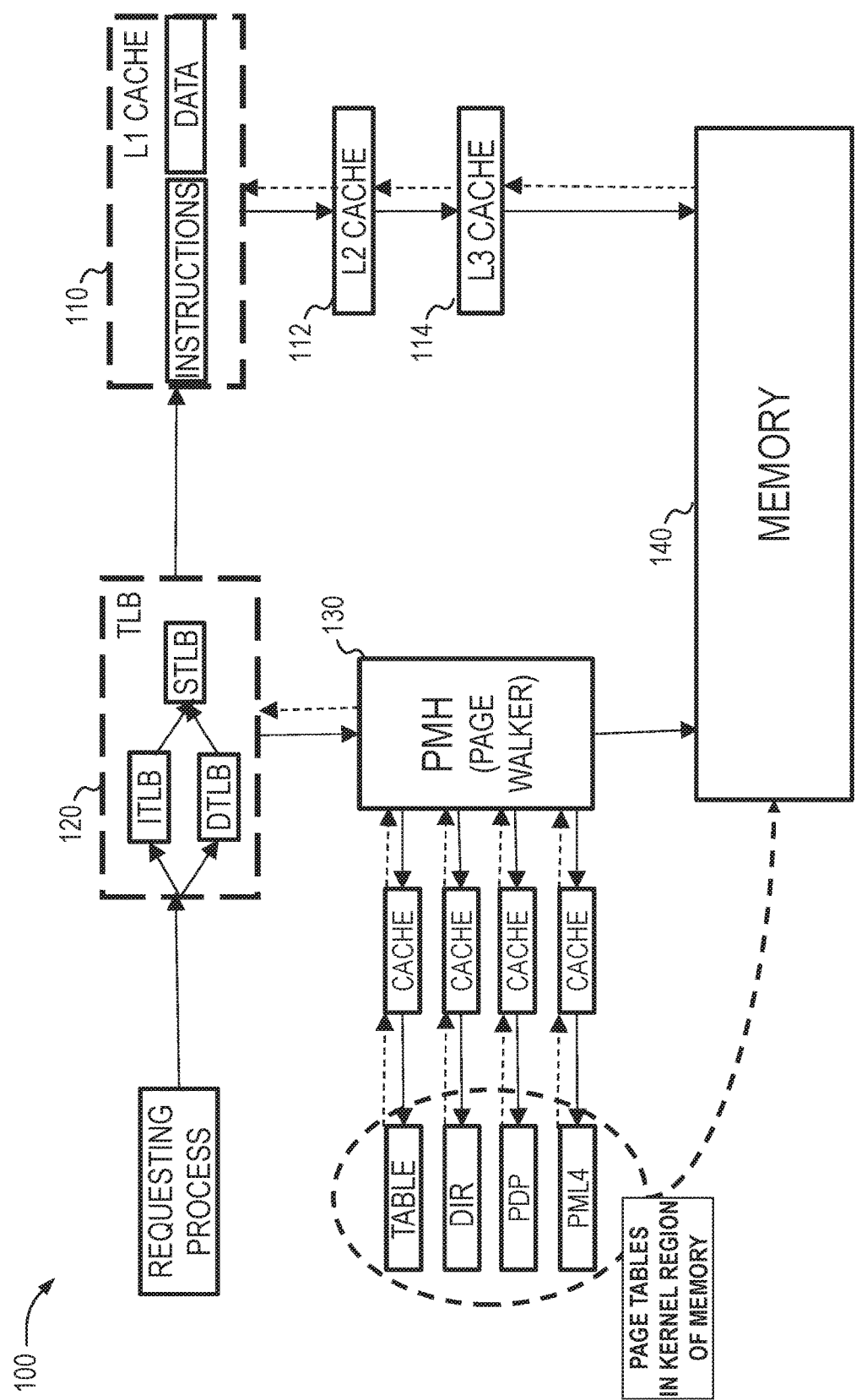
FIG. 1 illustrates a memory processing architecture, according to an example.

FIG. 1 illustrates an example memory processing architecture 100 of a modern x86 CPU. As shown, the architecture includes caches 110, 112, 114, translation look aside buffers (TLBs) 120, and a Page Miss Handler (PMH) 130—a component of the Memory Management Unit (MMU)—for implementing virtual memory paging for system memory 140. The basic functionality of the caches 110, 112, 114 and the TLBs 120 is designed so that such components retain their information from one use to the next, and deliver this information faster than regular memory. In general, every time a piece of information—instructions, data, address resolution—is obtained, it is stored in an appropriate cache or a buffer, so that on subsequent accesses to the same information, required it is taken from the cache or buffer rather than from its regular source.

Due to economy and physical reasons, the caches 110, 112, 114, and TLBs 120 may be shared between processes running on a CPU, and sometimes on several CPUs embedded in the same package. Additionally, such these components are relatively small, and utilize sophisticated algorithms for loading—and keeping—the pieces of information most likely to be re-used in the fastest possible cache.

Figure 2:
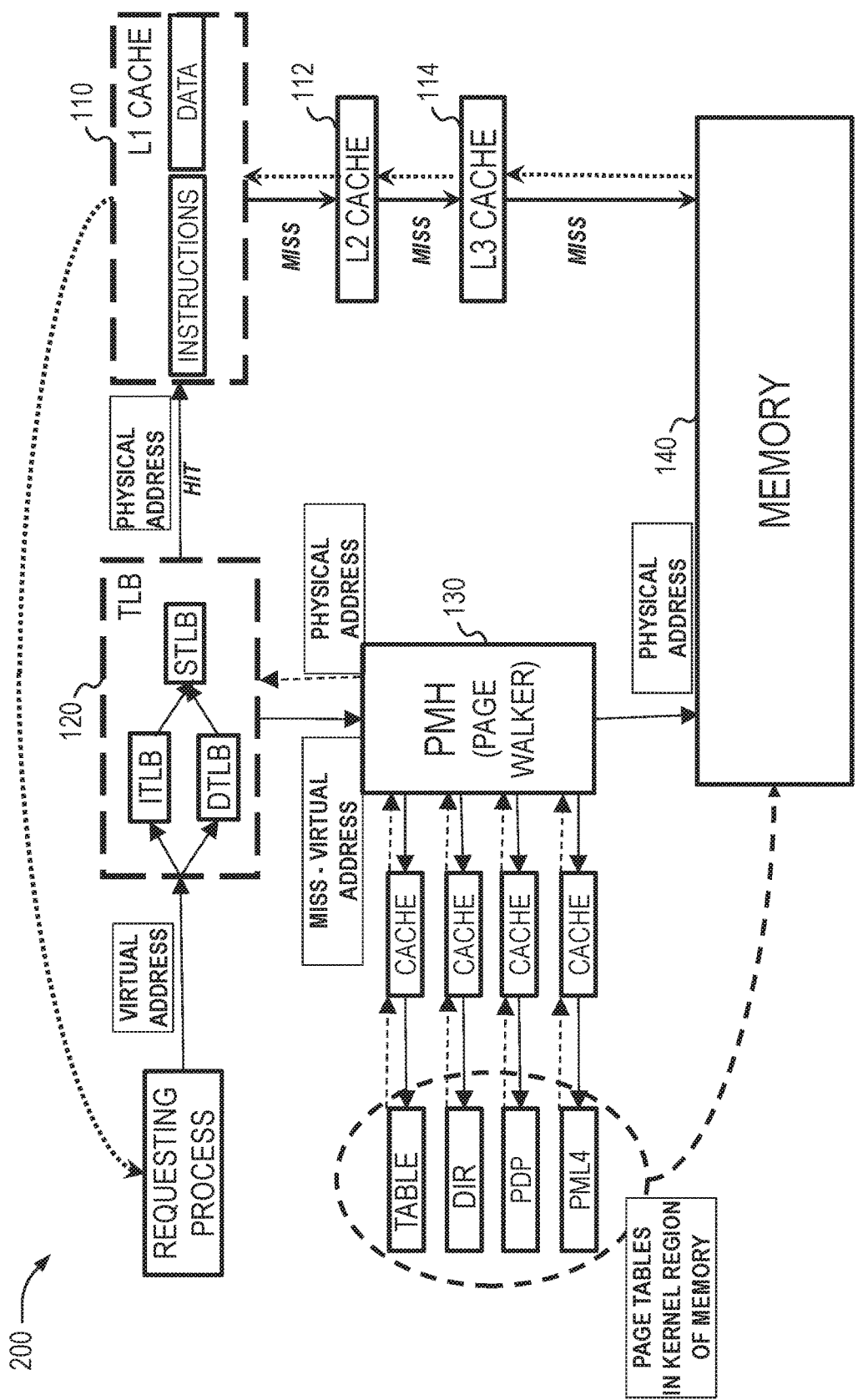
FIG. 2 illustrates a memory processing architecture implementing a flow of address and memory content information in operational use cases, according to an example.

FIG. 2 illustrates an example memory processing architecture 200 implementing an example flow of address and memory content information. Specifically, the architecture 200 in FIG. 2 depicts operational use cases involving memory page or cache line hits and misses, with a simplified representation of how x86 hardware translates a virtual memory address to a physical address. Note that the "Caches" and "Buffers" depicted in the architecture 200 may be implemented as fast memories internal to a CPU (except L3 cache 114, which may be shared between several CPUs within the same physical package), while the "Memory" 140 is external Dynamic Random Access Memories (DRAM). Additionally, the Page Tables used by the PMH 130 reside in the external DRAM (e.g., the system memory 140).

A user process' request for accessing its virtual memory (e.g., read, write) is routed first to the Translation Lookaside Table (TLB) 120, itself including an Instructions TLB (ITLB), a Data TLB (DTLB), and a unified Secondary TLB (STLB). If none of these buffers contain the requested address translation to a physical memory page—in other words, all relevant TLBs miss—then the MMU hardware goes to the Page Miss Handler (PMH) 130.

Figure 3:
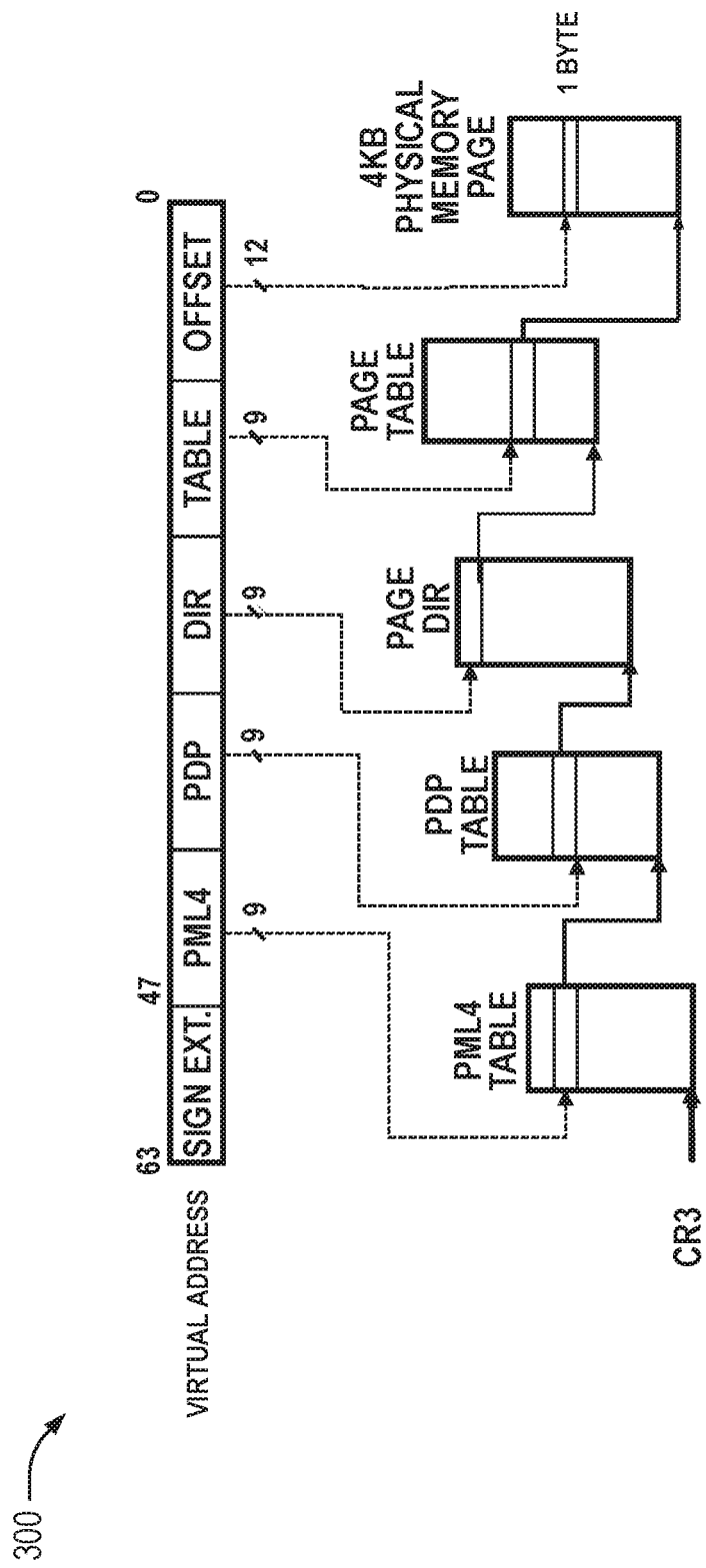
FIG. 3 illustrates translation from a virtual memory address to a physical memory address via page tables, according to an example.

FIG. 3 illustrates an example technique 300 for translation from a virtual memory address to a physical memory address via page tables. The current-design x86 PMH (e.g., PIM 130) performs a "Page Walk", building up the address of a page in physical memory by traversing Page Tables (e.g., as many as four or five tables and levels) located in Kernel memory space.

In the example technique 300, on context switching, the CPU loads hardware register CR3 with the base address of the first table (Page Map Level 4—PML4), and the nine (9) bits of the virtual address serve as an index into the table to produce the base address of the next level (Page Directory Pointer—PDP). The process repeats with the next level, Page Directory (PD), and the next level, the Page Table (PT). Thus, each level table is 4K bytes (512 ($2^9$) lines, each 8 bytes long) and the complete "page walk" specifies a 4 KB page in physical memory. The final, byte-level addressing within the 4 KB page is achieved through a twelve-bit offset. (It will be noted that this and other examples in the present application are provided in terms of 4 KB pages and four-level paging. Other page sizes and paging levels, depending on paging mode, are possible and usable with the techniques discussed herein).

Traversing the page table structure takes a relatively long time, so the PMH has its own caches, associated with each of the page tables (as shown in caches illustrated in the architectures 100, 200 discussed above). The presence of matching information in each of caches and buffers shown in the simplified drawing has some impact on the time it takes to perform certain commands. Thus, although logically two separate processes running in the same CPU, or in different CPUs within the same package, may be completely isolated and cannot pass any information from one to the other except in a manner allowed by privileged software, such as an OS, Virtual Memory Manager (VMM) or Container manager, information may still be passed. Specifically, this information may indicate the time required to perform an operation by one process is affected by whether data, an instruction, or even parts of the path of physical address translation, are cached due to another operation performed by the second process. Such routes for passing information are commonly termed "Side Channels".

The system software (e.g., VMM and OS) may assign properties to various areas of memory, and one of these properties is the privileges allowed to access the area of memory, such as read/modify data or run software instructions loaded from the area of memory. For brevity, such privileged areas are referred to herein as the "Ring 0 region" or "Kernel region", although such areas may include other privileged items (e.g. a Hardware Abstraction Layer (HAL), device drivers, a Virtual Machine Manager (VMM), etc.).

Any attempt to access privileged memory from non-privileged software will be prevented by the hardware, and result in an exception, with control passing to privileged software. Some attackers have succeeded in overcoming this limitation by selecting and "stringing together" sections—"Gadgets"—of privileged code already residing in memory. Attacks based on this concept are usually referred to as Return Oriented Programming (ROP), with variations such as Jump Oriented Programming (JOP) and Return to LibC. Chained together, gadgets may allow an attacker to perform arbitrary operations on a machine employing defenses that would otherwise thwart simpler attacks.

Kernel Address Space Randomization (KASLR) is one of the techniques used by modern computer to prevent ROP attacks. KASLR is based on the principle that virtual addressing utilizes a very large address space—$2^{32}$ bytes (4 GB) for a 32-bit operating system (OS), and up to $2^{64}$ bytes (16 Exabytes) for a 64-bit OS (although current hardware generally limits the 64-bit addressing space to only $2^{48}$ bytes, or $2^{57}$ bytes, depending on paging mode). Privileged code, however, utilizes a much smaller space—typically about 100 MB in current implementations.

Figure 4:
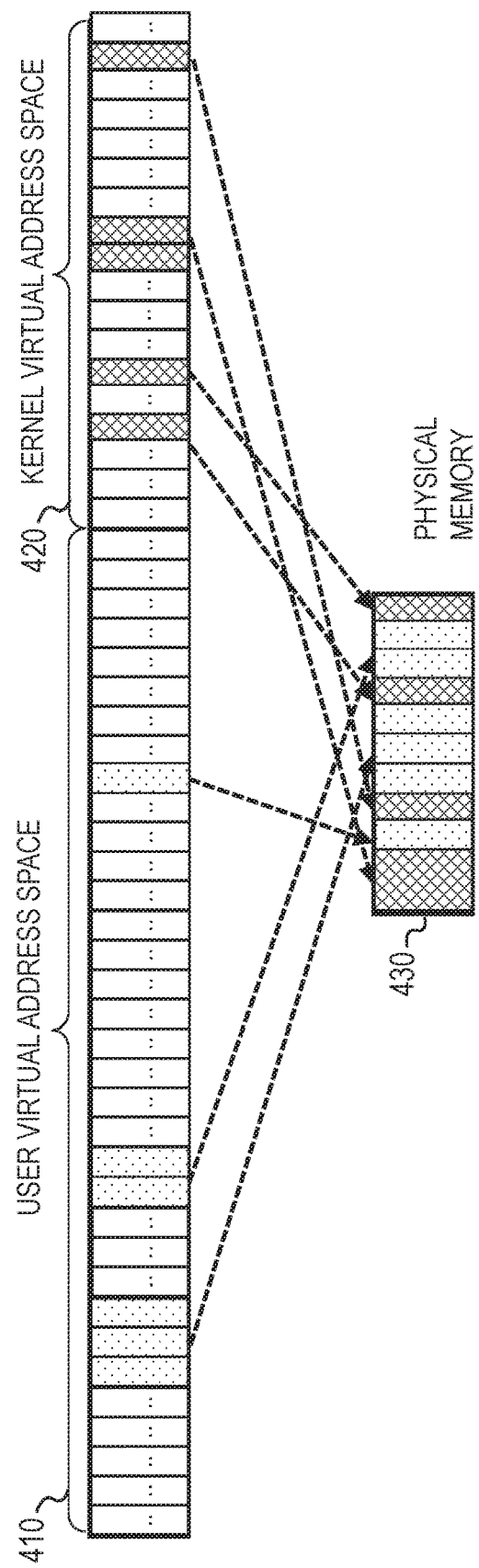
FIG. 4 illustrates virtual memory partitioning into Kernel and User address spaces, and associated mapping to physical memory, according to an example.

Privileged software is commonly implemented in a dedicated portion of the available virtual space—customarily, 1 GB in 32-bit systems, several terabytes in 64-bit systems, in a "Kernel" region. Thus, privileged software sets up itself and stores the actual code and data in random virtual addresses, somewhere within this Kernel Region. As an illustration of this separated region, FIG. 4 depicts an example virtual memory partitioning into a Kernel virtual address space 420 and a User virtual address space 410, and associated mapping of pages from these spaces to physical memory 430.

Importantly, although the privileged code and data is—or is likely to be—stored in the same physical memory addresses for all processes, their virtual addresses—through KASLR—are not. Thus, when ROP gadgets are strung by virtual addresses, attacks become impractical due to KASLR protection. In fact such attacks, if attempted, are likely to lead to computer failure (e.g., a "blue screen" in the OS). However, KASLR protection may be overcome in some scenarios through Side Channel Analysis attacks, aimed at discovering the correct location of the privileged code in the attacker's virtual address space, as a preparatory step to the main ROP attack.

Side Channel Analysis (SCA) of the Kernel virtual address space is made possible because although any attempt to access privileged virtual memory from a non-privileged process is denied, the time required to receive such denial messages (often in the form of an exception), or the difference in response times between two access attempts, provides the information the attacker is seeking to identify privileged code locations. Additionally, the page lookup (page walk) architecture illustrated above shows that the time to respond is a function of not only whether the translation of the requested address is already in-cache, or that the content of the requested address is already cached, but also of where in the cache hierarchy that information resides, and the type of information (e.g. instructions or data).

Exception messages received by the OS, VMM, or the like when a process is denied access, may theoretically be used to detect attacks. However, because such exceptions may also occur in circumstances other than an attack, such detection conventionally involves the collection of statistics.

Thus, conventional software-based detection of an SCA attack may riot be able to timely detect the attack, have appreciable false positives and false negative results, and often involve a high performance penalty.

Additionally, hardware exception handling for certain commands may be inadequate to detect an attack. For example, access attempts through Prefetch instructions are typically denied—and provide side-channel information—but do not cause exceptions. Further, access attempts may be carried within a transactional region defined through a Transactional Synchronization Extensions (TSX) instructions, in which an exception is supplied directly to the attacking process, bypassing the privileged software layers. Thus, SCA attacks using Prefetch, TSX and the like may be un-detectable with current approaches, even by the OS or Virtual Machine Manager (VMM) monitoring of exceptions.

The following techniques provide a variety of mechanisms for detection, prevention, and response to attacks. In an example, the disclosed mechanisms include a creation and presence of "Phantom Pages" mapped to the kernel region of each user process' virtual memory. Variations to the use and deployment of such pages is discussed below.

As discussed above, in a typical computing system, the total virtual space for a given CPU is determined by its architecture, typically ranging from $2^{32}$ bytes (4 GB), to $2^{48}$ bytes (256 Petahytes). Such computers employ "mapping" schemes that create—for each active process—a correspondence between that process' virtual memory, and portion of the (typically) much smaller physical memory actually present in the machines.

As shown in FIG. 4, the virtual memory space may be divided by the OS into a distinct "Kernel space" 420, usable essentially by privileged code and data, and into a "User space" 410, usable by other software applications. A user process may address the whole memory, but does not have permissions (or privileges) to access the privileged Kernel virtual address space 420. Addressing the privileged space in any way will therefore result in an error (e.g., an exception). As discussed above, the size of the Kernel virtual address space 420 may range from 1 GB to several terabytes, but only a small part is actually used by the privileged code and data. To avoid a waste of physical memory, only the actually-used virtual region is mapped to physical memory, through a MMU, with the virtual memory mapping scheme being managed by privileged processes (e.g., an OS and VMM, as discussed above with reference to FIGS. 1 and 2). Variations to the virtual memory management may be implemented with the following techniques.

Phantom Pages. As discussed in the following paragraphs, "Phantom Pages" refers to page addresses in a large number of "unused", and otherwise unmapped, Kernel virtual memory pages (e.g., space 420). They are rendered "Phantoms" through the process, described below, of mapping a large number of such pages from virtual memory to a small number—one or more—physical memory page address, referred below as "Trap pages". In an example, a technique for detecting the use of SCA attacks is provided by a combination of two facilities: Phantom pages mapped into Trap Pages and "Trap Entry detectors". The combined use of Trap pages and Trap Entry detectors is referred to as a "Trap+Trigger".

Trap Pages. As discussed in the following paragraphs, "Trap Pages" refers to physical memory page addresses (which may or may not have a corresponding physical memory), into which some portion (e.g., all or almost all) of the "Phantom pages"—otherwise unused and unmapped Kernel virtual memory space pages—are mapped. An attacker does not know where—in virtual memory—the actual privileged code and data is mapped. As a result, an attacker must search through their instance of kernel-region virtual memory, with each searched memory location investigated for side-channel timing behavior. Because the Phantom space is much larger than the actual Kernel, the probability of the attacker trying to access (or "hit") a Phantom is much larger than that of hitting a real Kernel address. However, a non-attacker process is highly unlikely to hit a Phantom, except due to a bug in the process or its environment (e.g. device drivers).

Figure 5:
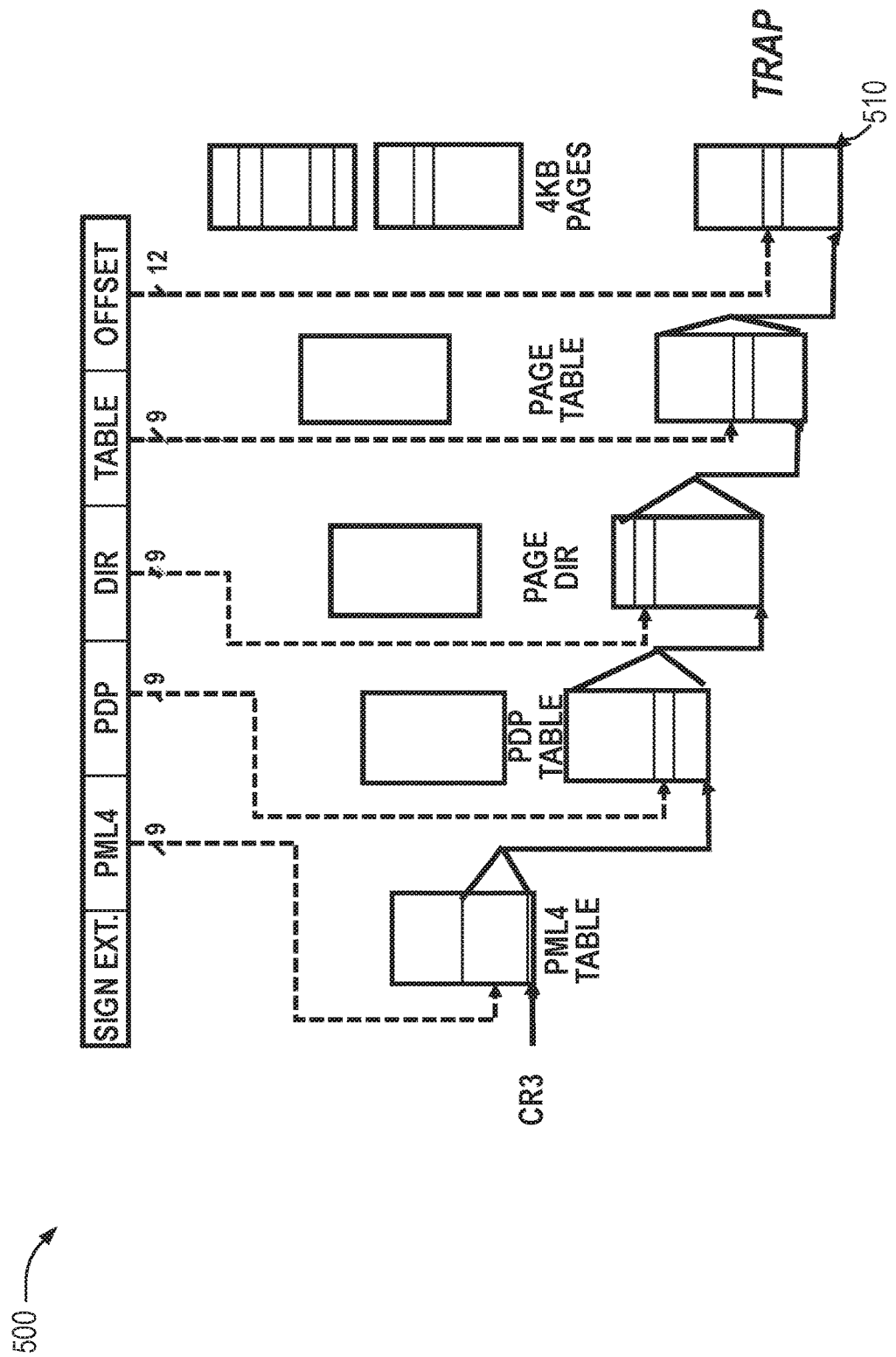
FIG. 5 illustrates mapping of a Kernel virtual address space to a "Trap" page in physical address space, according to an example.

In accordance with these techniques, FIG. 5 illustrates an example mapping technique 500 for a scenario involving mapping Kernel virtual address space Phantom pages to a "Trap" page 510 in physical address space. Specifically, the mapping technique 500 resembles the translation technique described above with reference to FIG. 3 (technique 300), but with additional table structures whose entries are arranged in such a manner that the many "Phantoms" are mapped to one—or a few—designated "Trap" page, 510 in physical memory.

Trap Entry Detection. As discussed in the following paragraphs, "Trap Entry" occurs when a process reaches a physical memory page (or physical memory page address) designated as a trap, as described above. Such entry may be detected by the CPU facility that translates the process' virtual memory address to a physical address. As an example, x86 CPU architecture includes the PMH to perform such translation whenever the address is not already cached, performing a "page walk" through Page Tables set up by the OS or VMM for each process. Thus, the MMU may be modified to trigger on "hits"—access attempts—on physical addresses assigned to "Traps".

Additionally, x86 architecture typically includes a number of "Range Registers". Each of these registers may include a pair of registers—"Base" and "Mask"—that specify certain property of a range of physical addresses defined by a logical operation between the register pair, and a combination of hardware and software facility (e.g., microcode) that performs certain actions whenever an address within that range is accessed. In an example, this pair is defined to specify that a "hit" results in a specific message (e.g., exception) to the OS, VMM, etc.

Additionally, x86 Page Table structures typically includes bits that provides the hardware and the OS with information about the properties of the addressed physical memory, e.g., "Present", "Dirty", "Address space" or "Process ID". An additional (or reserved) bit, or a combination of such bits, may be used to indicate a Trap and facilitate detection of Trap entry.

It should be noted that address translation hardware does not necessarily require that physical memory be present at the resulting physical address. Thus, a "Trap page" may be implemented without wasting a page of expensive physical memory. It should also be noted that devices such as PMH obtain their information from Page Tables that are by themselves in physical memory. Thus, triggering may be obtained from a "hit" on a page table address rather than on the address specified by the attacking process. In an example, the "Trap+Trigger" technique imposes almost zero performance penalty on processes that do not hit a Trap. Thus, only the performance of attackers (and processes whose code includes bugs of a particular nature) is affected.

It should also be noted that although the description above assumes use of hardware to detect Trap entry, microcode and/or software may also be used, with the attending performance loss. However, because Trap hits are rare events, all post-trigger activities may be performed by microcode and software with small or virtually no performance loss.

It should also be noted that theoretically, a single "Trap hit" may be sufficient for the OS/VMM to invoke a penalty on the offending process. However, other policies, such as exceeding a set number of Trap hits, a number of hits per unit time, and the like, may be utilized.

It should also be noted that the Trap entry detector may be designed to provide the OS/VMM/etc. with additional information on the circumstances leading to the hit, such as the identity of the processes that caused the trap hit, the command environment (e.g. TSX region, Prefetch operation etc.) leading to the hit, and the like. Such information may be used to filter out trap hits that may be handled by regular OS/VMM mechanisms, and concentrate on hits that are not detectable by such mechanisms, such as TSX-based or Prefetch-based attacks, or legitimate access attempts by the privileged code itself.

It should also be noted that the detector actions are not limited to issuing messages, and may perform any other desirable action e.g. restore processor state, clear certain caches/buffers (e.g., TLB), or collect statistics for later analysis of user behavior.

In an example, "Trap +Trigger" includes three stages: a preparatory step of placing the phantoms, trap, triggering mechanism and post-trigger actions in place, a "run-time" monitoring of trap entry, and—only after trap entry is triggered—taking an action. However, there may be cases where for legal, business, or other reasons, system policy is not to take a punitive action such as implied by "Trap +Trigger". The following two methods, search space swamping and kernel misleading, are appropriate for such cases, because such methods involve only a preparatory step that is designed to hinder an attacker's "run-time" actions while ensuring that non-attackers are not affected.

Search Space Swamping. Assuming that due to system policy, TSX, Prefetch etc. attacks are not detected and "killed" immediately (e.g. the OS responding to a "Trap+Trigger" signal), the attacker may perform the search for the actual privileged addresses within his virtual memory. In an example, a technique for mitigating SCA attacks is provided by setting up "Phantoms" and "Traps" as above, including appropriate page attributes but without the trigger facility. Thus, the Phantom pages present to the attacker a much larger search space than actually needed, thus making the complete attack too lengthy to be of practical use.

Figure 6A:
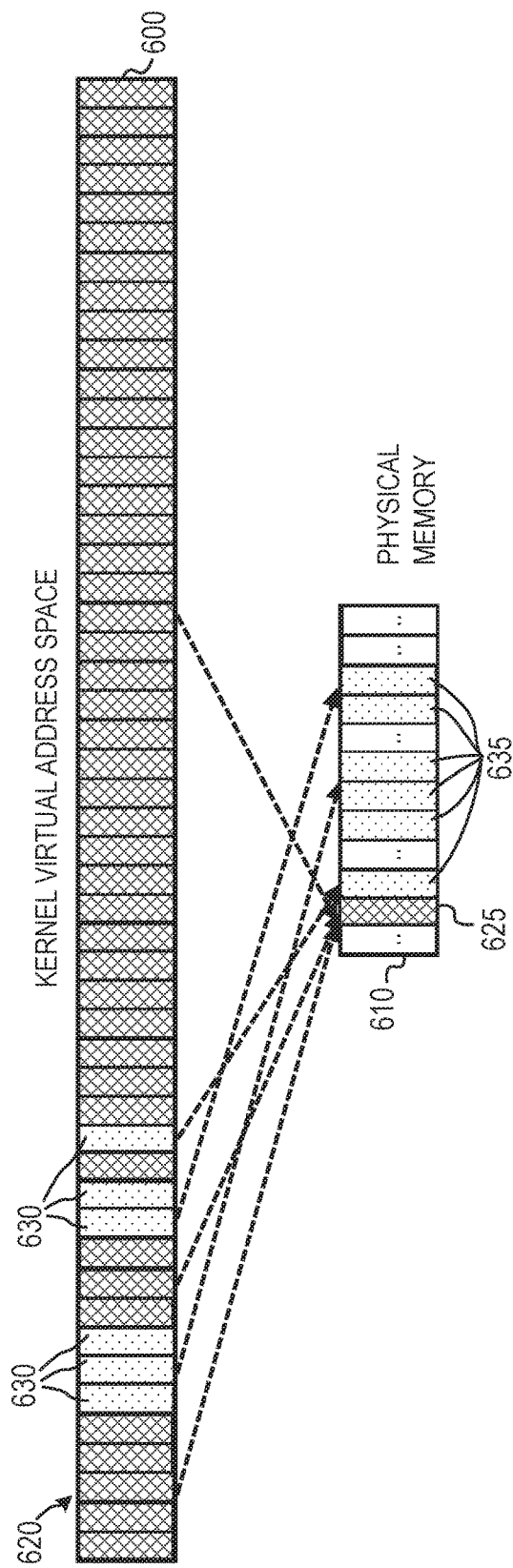
FIG. 6A illustrates a Search Swamping technique involving mapping of a Kernel virtual address space to a page in a physical address space, according to an example.

FIG. 6A illustrates an example Search Swamping technique involving mapping of a high proportion of a Kernel virtual address space to one page in a physical address space. As shown, within the kernel virtual address space 600, a large swath of the kernel virtual address space, pages 620, are made into "Phantoms" by mapping them to one physical Trap page (page 625) in the physical memory 610. Other valid kernel pages 630 remain mapped to respective pages (pages 635) in the physical memory 610.

The SCA signal is determined from the difference in the time required to access (successfully or not) mapped memory (e.g., virtual memory that—through TLB and Page Tables—maps into physical memory) versus un-mapped memory, both by itself and by the differential in timing due to the presence of the data or address in the various caches and the TLB. As described above, un-mapped Kernel virtual memory address space is much larger than the mapped portion the attacker is seeking. Thus, an attacker typically tries to use "course" and fast SCA methods to eliminate the un-mapped virtual regions, and then use finer—and slower—SCA methods e.g. the "pattern matching" described below, more repetitions etc. on the mapped regions.

Because now almost all virtual memory is mapped, the attacker is forced to use the slower, more precise SCA methods to obtain enough SCA signal-to-noise ratio over practically all of Kernel virtual memory. This is likely to increase the time required to complete an attack, possibly to the point of foiling it. This is even more likely because a typical attack target often runs many processes simultaneously, creating noise in the SCA time measurement. Thus, a typical attack has to examine so many points, and repeat so many times in order to filter out the SCA signal noise, that the attack is made unfeasible.

Note that the SCA average signal-to-noise ratio may be further reduced through application of one or more of the attributes described in "Kernel Misleading" (discussed below) in conjunction with the Trap(s).

Kernel Misleading. In an example, a technique for mitigating SCA attacks is provided by a combination of two facilities: "Phantoms and Traps", and "Page Properties Setting". The combination is termed here "Kernel Misleading".

Figure 6B:
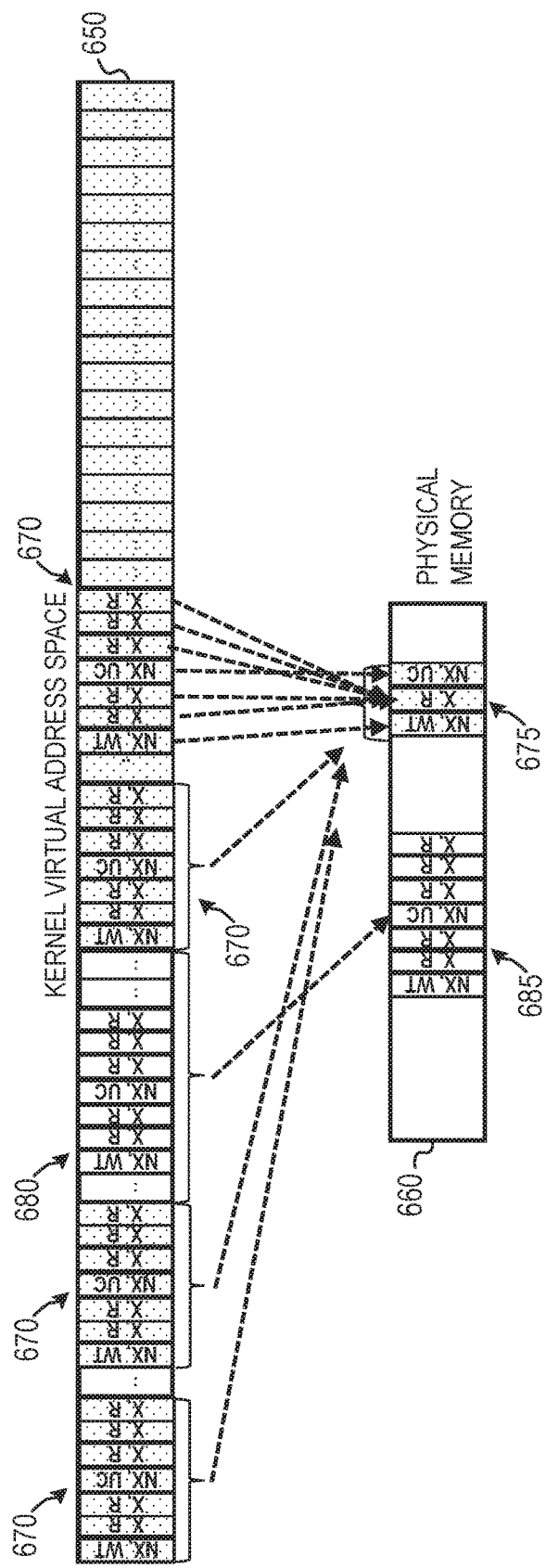
FIG. 6B illustrates a Kernel misleading technique involving creation of a large number of duplicate pages in a Kernel virtual address space, according to an example.

FIG. 6B illustrates a side-channel analysis (SCA)-detectable Kernel pattern 685 and an example technique for creation of a large nurrnber of duplicate pages in a kernel virtual address space 650, with minimal expenditure of actual physical memory 660, as part of a "Kernel Misleading" implementation. Prior to Kernel Misleading implementation, system administrators look—manually or automatically—for a number of such patterns likely to be used by attackers for precise location of Kernel gadgets, shown in the example as 680. As shown, Phantom pages 670 having the same pattern of page attributes as 680, due to being mapped to Traps 675 in physical memory whose attributes are identical to the valid kernel pages 680.

In an SCA attack, once the attacker identifies the actual kernel region, he has to identify the location of suitable "gadgets"—sections of privileged code that may be chained together to implement the actual attack. Such identification is conventionally performed by matching the pattern of minute response time variations received during the attack, to known (reference) patterns obtained beforehand, possibly on a similar computer system owned and operated by the attacker. Some of these time variations stem from different properties of the accessed physical memory. For example, besides the well-known Executable (X), Not executable (NX), Read Only (R), or Read Write (RW) properties, memory addresses in x86 architecture may be assigned (through Memory Type Range Registers (MTRRs), Page Attribute Tables (PATS) and similar arrangements) any one of six (6) memory types: Uncacheable=UC, Write-Combining=WC, Write-Through=WT, Write-Protect=WP, Write-Back=WB, and Reserved.

With a "Kernel Misleading" technique, multiple Phantom Pages may be assigned different properties and types, in such a way the time response pattern obtained by an attacker hitting on these Phantom Pages will be similar (or identical, with the constraints of process noise etc.) to the attacker's reference patterns, thus creating "Phantom Kernels". Since the number of the Phantoms Kernels may be large, the probability of the attacker using a Phantom location to construct his gadgets may be large, and thus the probability of foiling an attack is expected to be high.

It should be noted that although—at least in the x86 architecture—assignment of memory type and property may be performed without actually allocating physical memory for the Trap Pages, assuring that an attack using gadgets chained from these pages is "naturally" punished does require that suitable code is present in physical memory. However, such physical memory expenditure may be minimized by mapping as multiple instances of various pattern in virtual memory to a single instance of physical memory, as shown in the example.

The three techniques described above (e.g., Trap+Trigger illustrated in FIG. 5, Search Swamping illustrated in FIG. 6A, and Kernel Misleading depicted in FIG. 6B) may be combined in various permutations to create a more effective overall mitigation of SCA attacks on KASLR. For example, both Search Swamping and Kernel Misleading Phantom pages may be interspaced, and "Trap Pages"—even without the use of OS/VMM notification—may be employed to enhance pattern matching by having Trap processing in microcode manipulate the SCA timing to further mislead the attacker.

Figure 7:
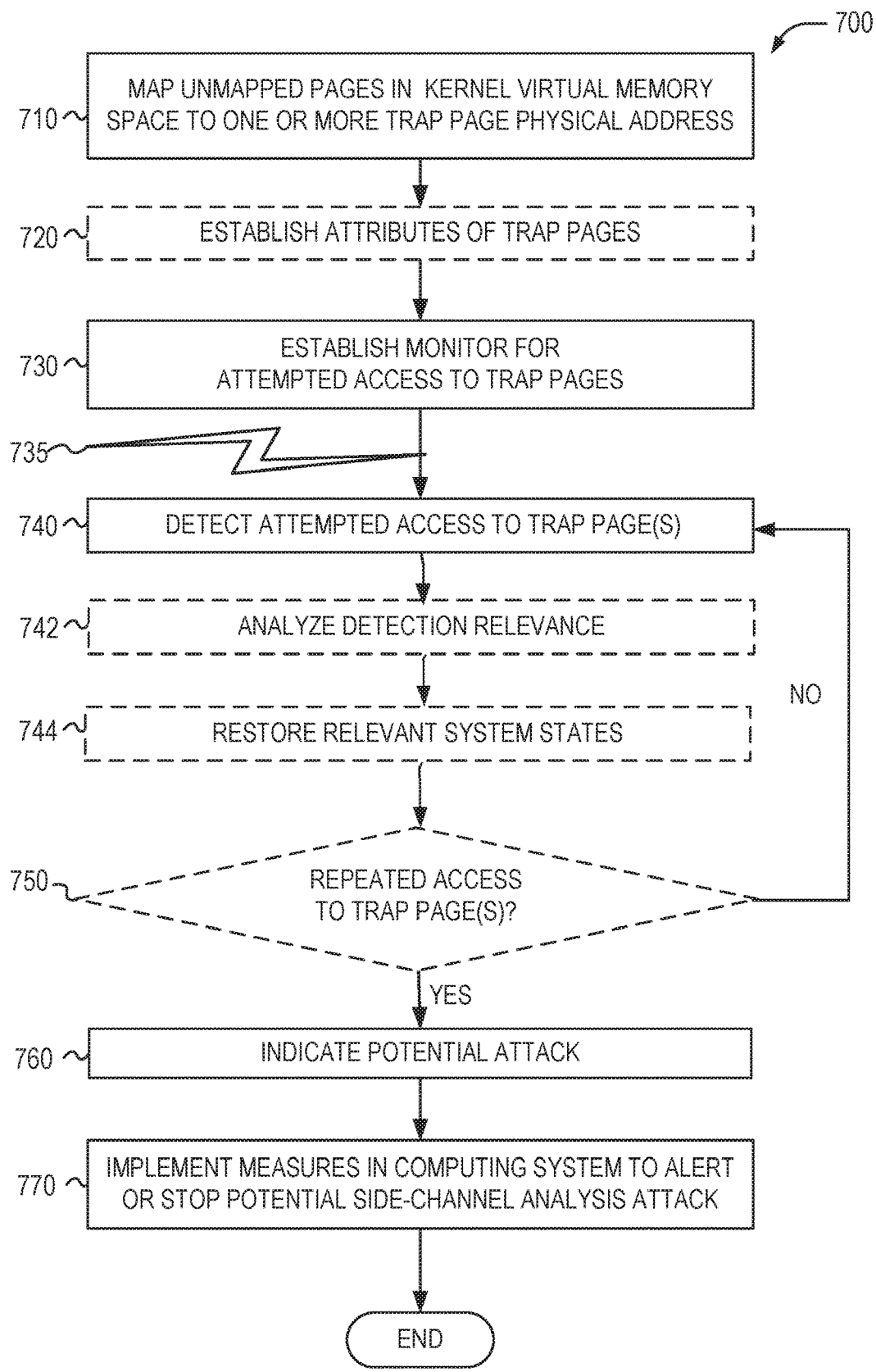
FIG. 7 illustrates a flowchart of a technique for establishing and monitoring "Trap" pages, according to an example.

FIG. 7 illustrates a flowchart 700 of an example technique for establishing and monitoring "Phantom" and "Trap" pages and Trap entries. As described herein, page table entries and trap pages may be used to detect attempted accesses to Phantom pages in virtual memory, under the assumption that such access attempts would occur only as a result of an attack, or as a result of unacceptable software errors.

The flowchart 700 depicts the operations for establishing the trap pages, including creating the Phantom pages at locations in kernel virtual memory address space not required for the (randomized) Kernel code (operation 710), by mapping them into one or more Trap pages in physical memory addresses, and optionally establishing the attributes for such trap pages (operation 720). The operations continue with the establishment of a monitor for an attempted access to such trap pages (operation 730). This monitor may be implemented at least in part by hardware operations.

The flowchart 700 continues with operations that detect access to one or more trap pages (operation 740, detecting the attempted access from event 735), and optionally detecting repeated access to the same or different trap pages (operation 750). As a result of the detection of access, operations may be performed to indicate a potential attack (operation 760) that may trigger hardware or software exceptions, events, logging, or like actions (Operation 742). Optionally, Operation 744 may be implemented to restore relevant system parameters to their pre-detection state. Attempted accesses to the trap pages—especially repeated ones—could indicate an attack, and trigger an appropriate response to detect or prevent unauthorized actions within the computing system.

For example, measures may be implemented within the computing system to alert and stop the potential SCA attack (operation 770). In still further examples, various features may be implemented to prevent further access or detection of kernel memory pages. The attack deterrence techniques discussed herein, for example, may provide such countermeasures. Note that in principle, the false alarm rate for a detection method that uses trap page table entries should be very low. Also, there may be minimal or no effect on performance, because regular users should not hit the trap pages (except in the case of a program error).

Figure 8:
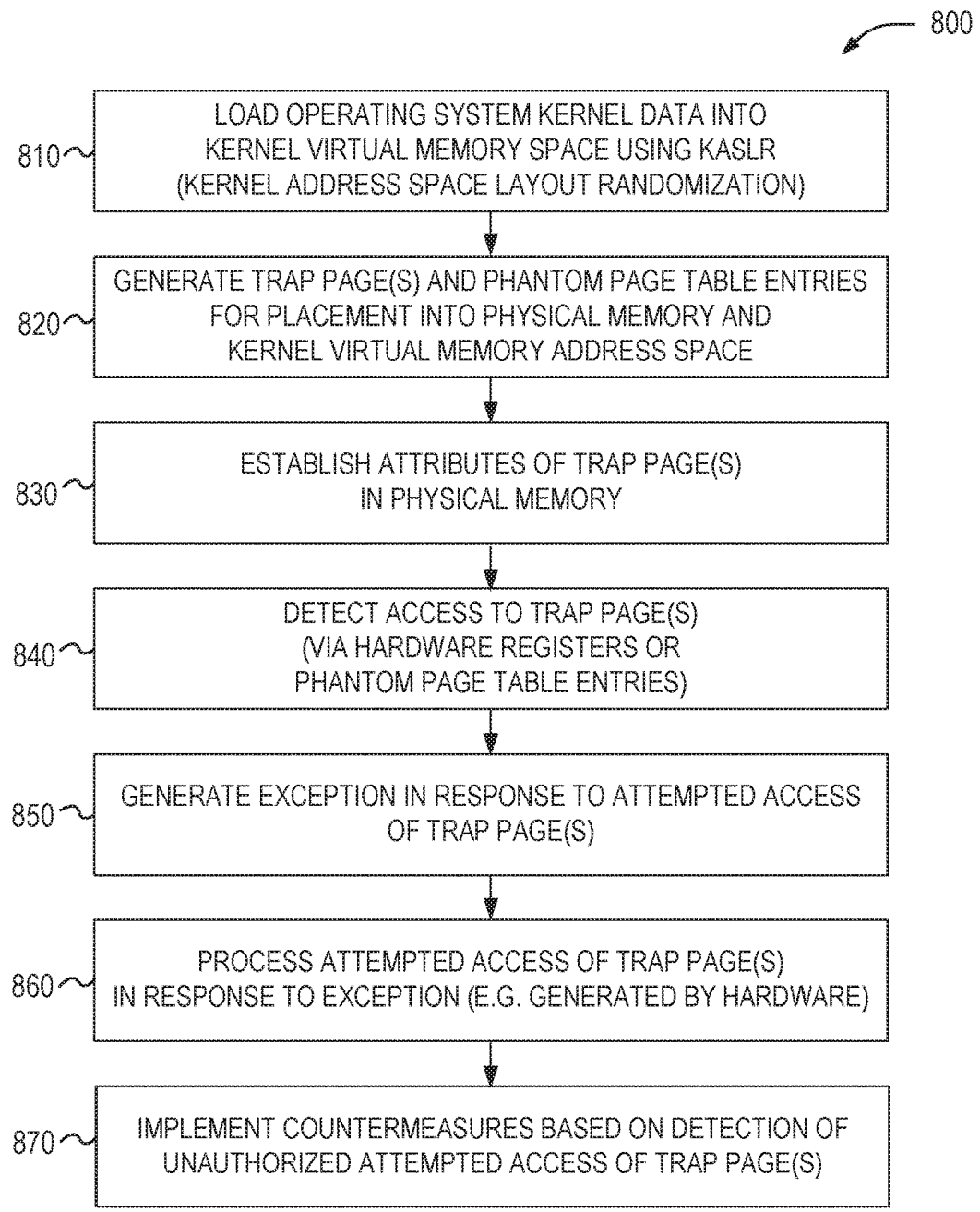
FIG. 8 illustrates a flowchart illustrating a method of detecting unauthorized attempts to access virtual memory pages, according to an example.

FIG. 8 illustrates a flowchart 800 of an example method of detecting unauthorized attempts to access virtual memory pages in accordance with the techniques above. The following operations of the flowchart 800 may be conducted by a computing system including hardware and software components to implement the following operations or the other operations discussed herein. It will be understood that the sequence and type of operations of the flowchart 800 may be potentially modified based on the other examples of SCA kernel page probe prevention and detection as provided herein.

The operations of the flowchart 800 begin with operations to load OS kernel data and other protected data into a kernel virtual memory address space using one or more security or memory management techniques, such as KASLR (operation 810). Other forms of randomization or address page distribution may also be employed. The operations of the flowchart 800 continue with the generation and placement of trap pages in physical memory and phantom pages in the kernel virtual memory space (operation 820) and the establishment of various attributes (e.g., read/write) for the phantom pages (operation 830). The generation and placement may include the insertion of one or multiple trap pages into physical memory, and the insertion of phantom page table entries in a page table map that maps to one or multiple of the trap pages in physical memory (e.g., to fill locations of unused memory addresses in the kernel virtual memory space, such as with use of the search space swamping technique discussed above). Further, because page table mapping may involve multiple table levels (e.g., 4 or 5 page table levels), the creation of a phantom page may involve multiple page table entries (e.g., 4 or 5 page table entries). The establishment of the various attributes may also include the use of kernel misleading as discussed. above.

The operations of the flowchart 800 continue with the detection of access (a single access, repeated access, patterned access, etc.) to the trap page (or multiple trap pages) in memory, (operation 840), which may be detected through hardware registers or access to one or more phantom page table entries in the kernel virtual memory address space. This may be followed by the generation of an exception (e.g., in hardware) in response to the attempted access of the trap page(s) (operation 850). The attempted access of the trap page(s) may he further handled in the computing system, based on processing of the exception generated (operation 860), and followed by countermeasures in software or hardware (operation 870). For example, one countermeasure may include randomization of access times to in-cache and out-of-cache pages, the equalization of access times to in-cache and out-of-cache pages, or the enactment of various security mechanisms in software. Other security and memory management techniques may also be implemented in response to the exception.

Figure 9:
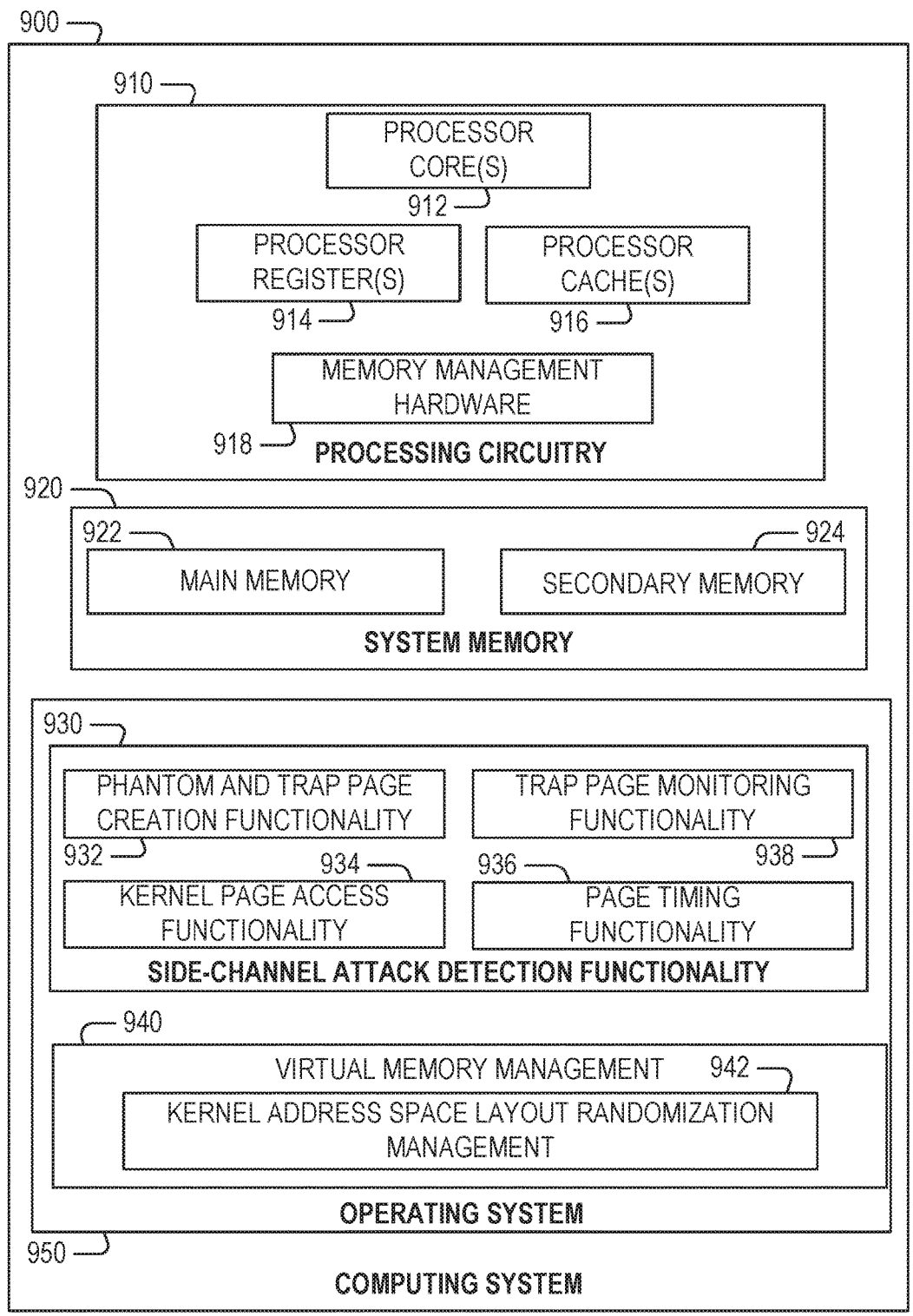
FIG. 9 illustrates a block diagram of components in an example computing system configured for detecting unauthorized attempts to access virtual memory pages, according to an example.

FIG. 9 illustrates a block diagram of components in an example computing system configured for detecting unauthorized attempts to access virtual memory pages. As shown, the block diagram depicts high-level components of electronic processing system 900 (e.g., a computing system) including processing circuitry 910, system memory 920, and an operating system 950. It will be understood that additional hardware and functional components (including those indicated in FIG. 10) may be added or substituted in the system 900.

The processing circuitry 910 is depicted as providing components including: one or more processor cores 912 to perform computational execution of instructions, one or more processor registers 914 to hold and operate on instructions and addresses, one or more processor caches 916 to hold and operate on data (including data retrieved from memory), and a memory management hardware 918 (e.g., a memory management unit, including a TLB and other buffers) used to provide access to memory, such as translation of virtual memory addresses to physical addresses. The page management techniques discussed herein (e.g., to prevent or detect kernel page access) may operate with use of the memory management hardware 918 to access and operate on the memory address space.

The system memory 920 is depicted as including main memory 922 and secondary memory 924, although in other examples a single memory unit or component may be present. For example, the main memory 922 may include high-speed volatile memory (RAM) used for pages loaded into memory from the virtual memory address space, while the secondary memory 924 may include lower-speed non-volatile memory (e.g., a SSD storage drive) that is temporarily used for other pages loaded into memory from the virtual memory address space.

The computing system 900 further depicts the use of an operating system 950 which includes virtual memory management 940 and side-channel attack prevention functionality 930. Such functionality may be provided from features of the operating system 950 or software loaded onto the operating system 950, such as with software-configured hardware that is implemented with use of the processing circuitry 910 and the system memory 920 (e.g., by instructions executed using the processing circuitry 910 and the memory 920).

In an example, the virtual memory management 940 performs management operations on behalf of operating system functions (including operating system kernel features) and executing software applications. The loading and deployment of memory pages into memory may be performed with use of KASLR management functionality 942, such as used to randomize locations of kernel pages in the virtual memory address space.

In a further example, the side-channel attack detection functionality 930 includes various components and functionality to implement the techniques discussed above (e.g., the SCA probe detection techniques discussed with reference to FIGS. 5 to 6B above). For example, the side-channel attack detection functionality 930 may include aspects of: phantom and trap page creation functionality 932 that is used to create and deploy the trap pages in a virtual memory address space as discussed above; kernel page access functionality 934 that is used to obscure the unauthorized discovery and access of kernel pages in a virtual memory address space as discussed above; page timing functionality 936 that is used to obscure or change the timing to access pages in virtual memory address space as discussed above; and trap page monitoring functionality 938 that is used to respond to the unauthorized discovery of trap pages as discussed above (including, to implement security responses). In further examples, the feature of the side-channel attack detection functionality 930 may be integrated within the KASLR management functionality 942 or other aspects of the operating system 950.

Figure 10:
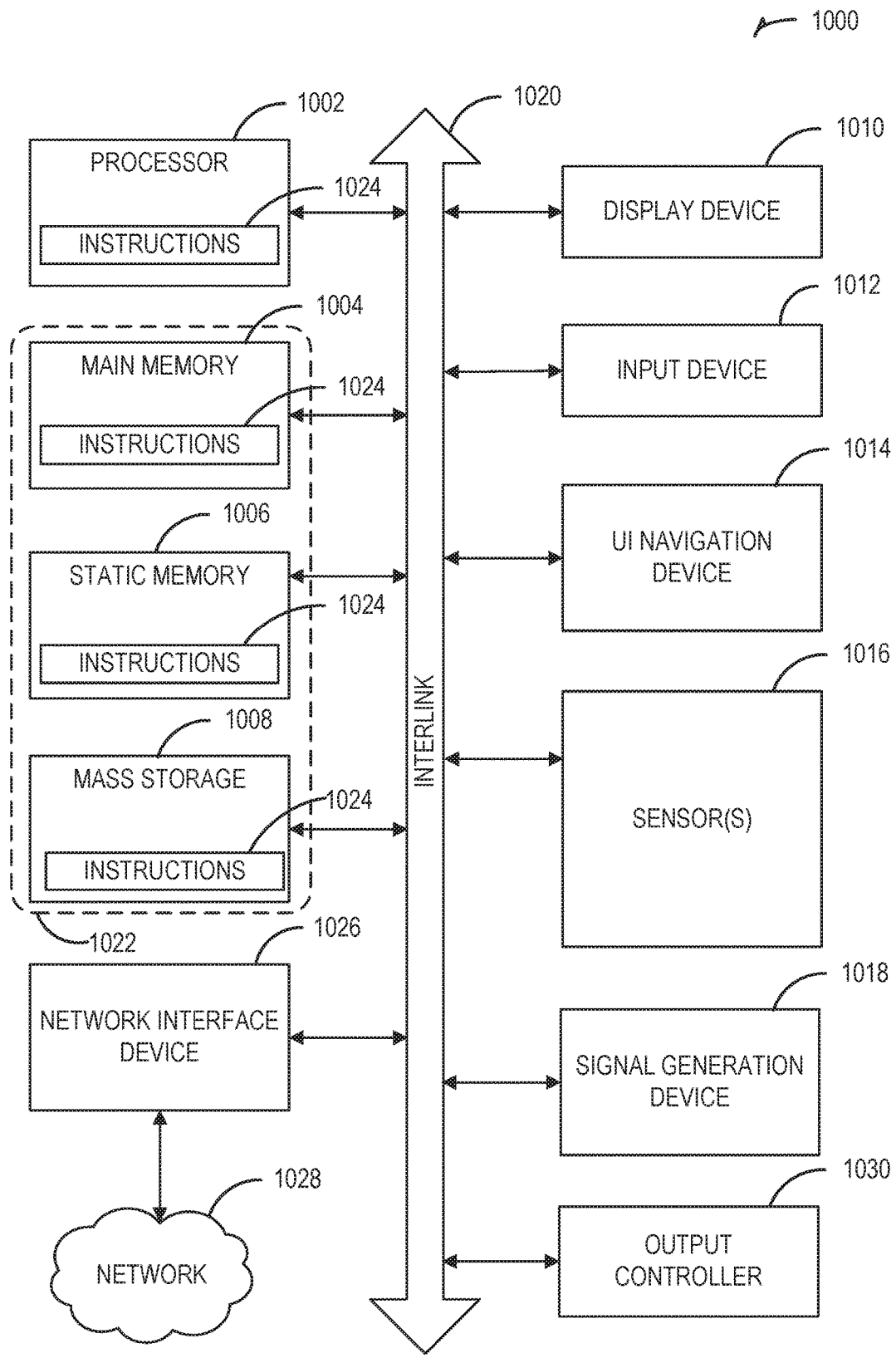
FIG. 10 illustrates a block diagram for an example electronic processing system (e.g., computer system) architecture upon which any one or more of the techniques (e.g., operations, processes, methods, and methodologies) discussed herein may be performed, according to an example.

FIG. 10 is a block diagram illustrating a machine 1000 in the example form of an electronic processing system, within which a set or sequence of instructions may be executed to cause the machine to perform any one of the methodologies discussed herein, according to an example embodiment. Circuitry (e.g., processing circuitry) refers to a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In various embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet, a set-top box, a personal digital assistant, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drive, tape drive, flash storage, or other block devices) some or all of which may communicate with each other via an interlink (e.g., bus) 1020. The machine 1000 may further include a display unit 1010, an alphanumeric input device 1012 (e.g., a keyboard), and a user interface (UI) navigation device 1014 (e.g., a mouse). In an example, the display unit 1010, input device 1012 and 111 navigation device 1014 may be a touch screen display. The machine 1000 may additionally include a storage device (e.g., drive unit) 1016, a signal generation device 1018 (e.g., a speaker), a network interface device 1026, and one or more sensors 1016, such as a global positioning system (GPS) sensor, compass, accelerometer, or other sensor. The machine 1000 may include an output controller 1030, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 (e.g., a storage device) and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a composition of matter. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may be further transmitted or received over a communications network 1028 using a transmission medium via the network interface device 1026 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1026 may include one or more physical jacks (e.g., Ethernet, coaxial, or phone jacks) or one or more antennas to connect to the communications network 1028. In an example, the network interface device 1026 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like, Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even he distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a computing system adapted for detecting unauthorized attempts to access privileged virtual memory pages, the computing system comprising: memory to: host a plurality of privileged virtual memory pages in a privileged portion of a virtual memory address space; and maintain a page table map of page table entries, wherein the page table map is used to indicate respective physical addresses in memory of the plurality of privileged virtual memory pages; and processing circuitry to: generate a trap page at a physical memory address of the memory; assign a phantom page at an open location in the privileged portion of the virtual memory address space; generate phantom page table entries mapping the phantom page to the trap page; and detect access to the trap page, accessed via the phantom page table entries, to trigger a response to a potential attack.

In Example 2, the subject matter of Example 1 includes, the processing circuitry further to generate the privileged virtual memory pages of an operating system kernel or virtual memory manager, assign the privileged virtual memory pages in the privileged portion of the virtual memory address space, and place page table entries for the privileged virtual memory pages using kernel address space layout randomization (KASLR).

In Example 3, the subject matter of Example 2 includes, wherein operations that assign the phantom page, include operations to establish attributes of the phantom page, wherein the attributes of the phantom page are established to reserrible pages of the privileged virtual memory pages.

In Example 4, the subject matter of Examples 1-3 includes, wherein attributes of the phantom page are established to indicate an executable, not executable, read only, read-write, uncacheable, write-combining, write-through, write-protect, write-back, or reserved status of a mapped page.

In Example 5, the subject matter of Examples 1-4 includes, the processing circuitry further to trigger the response to the potential attack, with operations that randomize or modify time to respond to the access to the trap page.

In Example 6, the subject matter of Examples 1-5 includes, the processing circuitry further to trigger the response to the potential attack, with operations to generate an exception.

In Example 7, the subject matter of Example 6 includes, wherein the exception is a page fault.

In Example 8, the subject matter of Examples 1-7 includes, wherein operations to assign the phantom page are performed from assignment of a plurality of phantom pages, and wherein operations to generate the phantom page table entries are performed to map the plurality of phantom pages to the trap page.

In Example 9, the subject matter of Examples 1-8 includes, the processing circuitry further to generate a plurality of virtual memory pages for respective software programs executing in the computing system, and assign the virtual memory pages of the respective software programs in a user portion of the virtual memory address space.

In Example 10, the subject matter of Examples 1-9 includes, wherein the access to the trap page is detected via hardware registers or operations on page table entries.

Example 11 is at least one machine readable storage medium, comprising a plurality of instructions adapted for detecting unauthorized attempts to access virtual memory pages, wherein the instructions, responsive to being executed with processor circuitry of a computing machine, cause the computing machine to perform operations that: generate a trap page in a memory, of the computing machine, wherein the computing machine operates a virtual memory address space, and wherein a privileged portion of the virtual memory address space is used to host a plurality of privileged virtual memory pages mapped in the memory of the computing machine; assign a phantom page at an open location in the privileged portion of the virtual memory address space; generate phantom page table entries in a page table map, the phantom page table entries mapping the phantom page to the trap page; detect access to the trap page, accessed via the phantom page table entries, to trigger a response to a potential attack.

In Example 12, the subject matter of Example 11 includes, wherein the instructions further cause the computing machine to generate the privileged virtual memory pages of an operating system kernel or virtual memory manager, assign the privileged virtual memory pages in the privileged portion of the virtual memory address space, and place page table entries for the privileged virtual memory pages using kernel address space layout randomization (KASLR).

In Example 13, the subject matter of Example 12 includes, wherein the instructions further cause the computing machine to establish attributes of the phantom page, wherein the attributes of the phantom page are established to resemble pages of the privileged virtual memory pages.

In Example 14, the subject matter of Examples 11-13 includes, wherein attributes of the phantom page are established to indicate an executable, not executable, read-only, read-write, uncacheable, write-combining, write-through, write-protect, write-back, or reserved status of a mapped page.

In Example 15, the subject matter of Examples 11-14 includes, wherein the access to the trap page is detected via hardware registers or operations on page table entries.

In Example 16, the subject matter of Examples 11-15 includes, wherein the instructions further cause the computing machine to trigger the response to the potential attack, with operations that generate an exception.

In Example 17, the subject matter of Examples 11-16 includes, wherein operations to assign the phantom page are performed from assignment of a plurality of phantom pages, and wherein operations to generate the phantom page table entries are performed to map the plurality of phantom pages to the trap page.

In Example 18, the subject matter of Examples 11-17 includes, wherein the instructions further cause the computing machine to generate virtual memory pages of software programs in the computing machine, and assign the virtual memory pages of the software programs in a user portion of the virtual memory address space.

Example 19 is a method of detecting unauthorized attempts to access virtual memory pages, the method comprising electronic operations performed in a computing machine, including: generating a trap page at a physical memory address of a memory of the computing machine, wherein the computing machine operates a virtual memory address space, and wherein a privileged portion of the virtual memory address space is used to host a plurality of privileged virtual memory pages mapped in the memory of the computing machine; assigning a phantom page at an open location in the privileged portion of the virtual memory address space; generating phantom page table entries in a page table map, the phantom page table entries mapping the phantom page to the trap page; maintaining the trap page in the memory and maintaining the phantom page table entry in the page table map; and detecting an access to the trap page, accessed via the phantom page table entries, to trigger a response to a potential attack.

In Example 20, the subject matter of Example 19 includes, generating the privileged virtual memory pages of an operating system kernel or virtual memory manager, assign the privileged virtual memory pages in the privileged portion of the virtual memory address space, and placing page table entries for the privileged virtual memory pages using kernel address space layout randomization (KASLR).

In Example 21, the subject matter of Example 20 includes, establishing attributes of the phantom page, wherein the attributes of the phantom page are established to resemble pages of the privileged virtual memory pages.

In Example 22, the subject matter of Examples 19-21 includes, wherein attributes of the phantom page are established to indicate an executable, not executable, read-only, read-write, uncacheable, write-combining, write-through, write-protect, write-back, or reserved status of a mapped page.

In Example 23, the subject matter of Examples 19-22 includes, triggering the response to the potential attack, with operations that randomize or modify time to respond to the access to the trap page.

In Example 24, the subject matter of Examples 19-23 includes, wherein the access to the trap page is detected via hardware registers or operations on page table entries.

In Example 25, the subject matter of Examples 19-24 includes, triggering the response to the potential attack, with operations that generate an exception.

In Example 26, the subject matter of Example 25 includes, triggering a page fault in the computing machine in response to the exception.

In Example 27, the subject matter of Examples 19-26 includes, generating a plurality of phantom pages including the phantom page; wherein assigning the phantom page is performed with assignment of the plurality of phantom pages at open locations in the privileged portion of the virtual memory address space; and wherein generating the phantom page table entries is performed to map the plurality of phantom pages to the trap page.

Example 28 is at least one machine readable medium including instructions, which when executed by a computing system, cause the computing system to perform any of the methods of Examples 19-27.

Example 29 is an apparatus comprising means for performing any of the methods of Examples 19-27.

Example 30 is an apparatus, comprising: means for generating a trap page at a physical memory address, for a computing machine operates a virtual memory address space, wherein a privileged portion of the virtual memory address space is used to host a plurality of privileged virtual memory pages mapped in the memory of the computing machine; means for assigning a phantom page at an open location in the privileged portion of the virtual memory address space; means for generating phantom page table entries in a page table map, the phantom page table entries mapping the phantom page to the trap page; means for maintaining the trap page in the memory and maintaining the phantom page table entry in the page table map; and means for detecting an access to the trap page, accessed via the phantom page table entries, to trigger a response to a potential attack.

In Example 31, the subject matter of Example 30 includes, means for generating the privileged virtual memory pages of an operating system kernel or virtual memory manager, assign the privileged virtual memory pages in the privileged portion of the virtual memory address space, and placing page table entries for the privileged virtual memory pages using kernel address space layout randomization (KASLR).

In Example 32, the subject matter of Examples 30-31 includes, means for establishing attributes of the phantom page, wherein the attributes of the phantom page are established to resemble pages of the privileged virtual memory pages.

In Example 33, the subject matter of Example 32 includes, means for establishing the attributes of the phantom page to indicate an executable, not executable, read-only, read-write, uncacheable, write-combining, write-through, write-protect, write-back, or reserved status of a mapped page.

In Example 34, the subject matter of Examples 30-33 includes, means for detecting the access to the trap page.

In Example 35, the subject matter of Examples 30-34 includes, means for triggering the response to the potential attack, with operations that generate an exception.

In Example 36, the subject matter of Example 35 includes, means for triggering a page fault in the computing machine in response to the exception.

In Example 37, the subject matter of Example 36 includes, means for triggering the response to the potential attack, with operations that randomize or modify time to respond to the access to the trap page.

In Example 38, the subject matter of Examples 30-37 includes, means for generating a plurality of phantom pages including the phantom page; means for generating assigning the phantom page with assignment of the plurality of phantom pages at open locations in the privileged portion of the virtual memory address space; and means for mapping the phantom page table entries for the plurality of phantom pages to the trap page.

Example 39 is a system to perform the operations of any of the Examples 1-38.

Example 40 is a method to perform the operations of any of the Examples 1-38.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system adapted for detecting unauthorized attempts to access privileged virtual memory pages, the computing system comprising:
   memory to:
      host a plurality of privileged virtual memory pages in a privileged portion of a virtual memory address space; and
      maintain a page table map of page table entries, wherein the page table map is used to indicate respective physical addresses in the memory for the plurality of privileged virtual memory pages; and
   processing circuitry to:
      generate a trap page accessible at a physical memory address of the memory, by assigning the physical memory address to the trap page in the page table map;
      assign a phantom page at an open location in the privileged portion of the virtual memory address space;
      generate phantom page table entries mapping the phantom page to the physical memory address of the trap page;
      detect access to the physical memory address of the trap page, accessed via a page hit to the phantom page table entries, to identify a potential attack on the privileged portion of the virtual memory space; and
      trigger a response to the potential attack, by randomizing or modifying time to respond to the access to the physical memory address of the trap page.

2. The computing system of claim 1, the processing circuitry further to generate the privileged virtual memory pages of an operating system kernel or virtual memory manager, assign the privileged virtual memory pages in the privileged portion of the virtual memory address space, and place page table entries for the privileged virtual memory pages using kernel address space layout randomization (KASLR).

3. The computing system of claim 2, wherein operations that assign the phantom page, include operations to establish attributes of the phantom page, wherein the attributes of the phantom page are established to resemble pages of the privileged virtual memory pages.

4. The computing system of claim 1, wherein attributes of the phantom page are established to indicate an executable, not executable, read only, read-write, uncacheable, write-combining, write-through, write-protect, write-back, or reserved status of a mapped page.

5. The computing system of claim 1, the processing circuitry further to trigger the response to the potential attack, by generating an exception.

6. The computing system of claim 5, wherein the generated exception is a page fault.

7. The computing system of claim 1, wherein operations to assign the phantom page are performed from assignment of a plurality of phantom pages, and wherein operations to generate the phantom page table entries are performed to map the plurality of phantom pages to the physical memory address of the trap page.

8. The computing system of claim 1, the processing circuitry further to generate a plurality of virtual memory pages for respective software programs executing in the computing system, and assign the virtual memory pages of the respective software programs in a user portion of the virtual memory address space.

9. The computing system of claim 1, wherein the access to the physical memory address of the trap page is detected via hardware registers or operations on page table entries.

10. At least one non-transitory machine readable storage medium, comprising a plurality of instructions adapted for detecting unauthorized attempts to access virtual memory pages, wherein the instructions, responsive to being executed with processor circuitry of a computing machine, cause the computing machine to perform operations that:
generate a trap page accessible at a physical memory address in a memory of the computing machine, by mapping a trap page entry to the physical memory address in a page table map, wherein the computing machine operates a virtual memory address space, and wherein a privileged portion of the virtual memory address space is used to host a plurality of privileged virtual memory pages mapped in the memory of the computing machine;
assign a phantom page at an open location in the privileged portion of the virtual memory address space;
generate phantom page table entries in the page table map, the phantom page table entries mapping the phantom page to the physical memory address of the trap page;
detect access to the physical memory address of the trap page, accessed via a page hit to the phantom page table entries, to identify a potential attack; and
trigger a response to the potential attack, by randomizing or modifying time to respond to the access to the physical memory address of the trap page.

11. The machine readable storage medium of claim 10, wherein the instructions further cause the computing machine to generate the privileged virtual memory pages of an operating system kernel or virtual memory manager, assign the privileged virtual memory pages in the privileged portion of the virtual memory address space, and place page table entries for the privileged virtual memory pages using kernel address space layout randomization (KASLR).

12. The machine readable storage medium of claim 11, wherein the instructions further cause the computing machine to establish attributes of the phantom page, wherein the attributes of the phantom page are established to resemble pages of the privileged virtual memory pages.

13. The machine readable storage medium of claim 10, wherein attributes of the phantom page are established to indicate an executable, not executable, read-only, read-write, uncacheable, write-combining, write-through, write-protect, write-back, or reserved status of a mapped page.

14. The machine readable storage medium of claim 10, wherein the access to the physical memory address of the trap page is detected via hardware registers or operations on page table entries.

15. The machine readable storage medium of claim 10, wherein the instructions further cause the computing machine to trigger the response to the potential attack, by generating an exception.

16. The machine readable storage medium of claim 10, wherein operations to assign the phantom page are performed from assignment of a plurality of phantom pages, and wherein operations to generate the phantom page table entries are performed to map the plurality of phantom pages to the physical memory address of the trap page.

17. The machine readable storage medium of claim 10, wherein the instructions further cause the computing machine to generate virtual memory pages of software programs in the computing machine, and assign the virtual memory pages of the software programs in a user portion of the virtual memory address space.

18. A method of detecting unauthorized attempts to access virtual memory pages, the method comprising electronic operations performed in a computing machine, including:
generating a trap page accessible at a physical memory address of a memory of the computing machine, by assigning the physical memory address to the trap page in a page table map, wherein the computing machine operates a virtual memory address space, and wherein a privileged portion of the virtual memory address space is used to host a plurality of privileged virtual memory pages mapped in the memory of the computing machine;
assigning a phantom page at an open location in the privileged portion of the virtual memory address space;
generating phantom page table entries in the page table map, the phantom page table entries mapping the phantom page to the physical memory address of the trap page;
maintaining the trap page at the physical memory address of the memory and maintaining the phantom page table entry in the page table map;
detecting an access to the physical memory address of the trap page, accessed via the phantom page table entries, to identify a potential attack; and
trigger a response to the potential attack, by randomizing or modifying time to respond to the access to the physical memory address of the trap page.

19. The method of claim 18, the electronic operations further including generating the privileged virtual memory pages of an operating system kernel or virtual memory manager, assign the privileged virtual memory pages in the privileged portion of the virtual memory address space, and placing page table entries for the privileged virtual memory pages using kernel address space layout randomization (KASLR).

20. The method of claim 19, the electronic operations further including establishing attributes of the phantom page, wherein the attributes of the phantom page are established to resemble pages of the privileged virtual memory pages.

21. The method of claim 18, wherein attributes of the phantom page are established to indicate an executable, not executable, read-only, read-write, uncacheable, write-combining, write-through, write-protect, write-back, or reserved status of a mapped page.

22. The method of claim 18, wherein the access to the physical memory address of trap page is detected via hardware registers or operations on page table entries.

23. The method of claim 18, the electronic operations further including:
    triggering the response to the potential attack, with operations that generate an exception; and
    triggering a page fault in the computing machine in response to the exception.

24. The method of claim 18, the electronic operations further including:
    generating a plurality of phantom pages including the phantom page;
    wherein assigning the phantom page is performed with assignment of the plurality of phantom pages at open locations in the privileged portion of the virtual memory address space; and
    wherein generating the phantom page table entries is performed to map the plurality of phantom pages to the physical memory address of the trap page.

25. The machine readable storage medium of claim 15, wherein the generated exception is a page fault.

* * * * *